United States Patent
Lim et al.

(10) Patent No.: US 8,810,978 B2
(45) Date of Patent: Aug. 19, 2014

(54) SUPERCONDUCTING FAULT CURRENT LIMITER FOR SUPPRESSING BUS VOLTAGE DROP IN ELECTRIC POWER SYSTEM

(75) Inventors: Sung-Hun Lim, Seoul (KR); Jae-Chul Kim, Gwangmyeoung-si (KR); Il-Kyoung You, Seoul (KR); Jin-Seok Kim, Seoul (KR); Myoung-Hoo Kim, Gwangmyeong-si (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 50 days.

(21) Appl. No.: 13/582,444

(22) PCT Filed: Oct. 22, 2010

(86) PCT No.: PCT/KR2010/007266
§ 371 (c)(1),
(2), (4) Date: Sep. 3, 2012

(87) PCT Pub. No.: WO2011/108793
PCT Pub. Date: Sep. 9, 2011

(65) Prior Publication Data
US 2012/0327538 A1 Dec. 27, 2012

(30) Foreign Application Priority Data
Mar. 3, 2010 (KR) .................. 10-2010-0019061

(51) Int. Cl.
*H02H 9/02* (2006.01)

(52) U.S. Cl.
USPC ............................... 361/19; 361/93.9

(58) Field of Classification Search
CPC ................. H02H 9/023; Y02E 40/69
USPC ................................. 361/19, 93.9
See application file for complete search history.

(56) References Cited

U.S. PATENT DOCUMENTS

| 6,751,075 | B2 * | 6/2004 | Cha ........................... 361/19 |
| 2007/0230076 | A1 * | 10/2007 | Husband et al. ........... 361/58 |
| 2009/0021875 | A1 * | 1/2009 | Wolfus et al. .............. 361/58 |

FOREIGN PATENT DOCUMENTS

| KR | 10-2003-0062596 | * | 7/2003 |
| KR | 10-2003-0067770 | * | 10/2004 |
| KR | 10-2003-0062597 | * | 7/2005 |

OTHER PUBLICATIONS

Chung et al.; Study on Superconducting Faults Current Limiters Based on Normal Transformers; IEEE Transactions on Applied Superconductivity; Nov. 2011; Whole Doucument.*

*Primary Examiner* — Jared Fureman
*Assistant Examiner* — Nicholas Ieva
(74) *Attorney, Agent, or Firm* — William Park & Associates Patent Ltd.

(57) ABSTRACT

Disclosed herein is a Superconducting Fault Current Limiter (SFCL) for suppressing a bus voltage drop in an electric power system. A primary winding, a secondary winding, and a tertiary winding are wound around an identical iron core, and a superconductor is connected to any one of the primary winding and the secondary winding. A first switch is connected to any one of the primary winding and the secondary winding and is configured to be opened so as to separate a faulty section when a fault current is generated and to be shorted when the fault current is eliminated. A second switch is connected in series to the tertiary winding and is configured to be shorted so as to stably supply power when the fault current is generated and to be opened when the fault current is eliminated. According to the present invention, there are advantages in that a fault current is limited using magnetic coupling between two coils that are connected in a non-isolated type (in parallel or in series) or in an isolated type and in that a faulty section is separated using a switch and power is stably supplied to a section, in which a bus voltage drop has occurred due to the fault current, using a tertiary winding and a switch connected thereto, thus improving the stability of the system and obtaining economic effects.

6 Claims, 12 Drawing Sheets

SUPERCONDUCTING FAULT CURRENT LIMITER FOR SUPPRESSING BUS VOLTAGE DROP IN ELECTRIC POWER SYSTEM

CROSS-REFERENCE TO RELATED APPLICATION

This application is the National Stage of International Application No. PCT/KR2010/007266, filed on Oct. 22, 2010, and claims priority to and the benefit of Korean Patent Application No. 2010-0019061, filed on Mar. 3, 2010, the disclosure of which is incorporated herein by reference in its entirety.

TECHNICAL FIELD

The present invention relates generally to a Superconducting Fault Current Limiter (SFCL) for suppressing a bus voltage drop in an electric power system, and, more particularly, to an apparatus that limits the magnitude of a fault current by promptly generating resistance using magnetic coupling and that supplies power to suppress a bus voltage drop when a fault has occurred.

BACKGROUND ART

To date, with an increase in power demand placed on power distribution systems and the introduction of distributed power sources, replacement of transformers with large-capacity transformers has been inevitably required. Accordingly, an increased fault current exceeds the capacity of a circuit breaker installed in the system, so that research into a superconducting fault current limiter (SFCL) has been conducted as a realistic scheme for improving the stability of the system and reducing economic cost stemming from replacing the circuit breaker with a large-capacity device.

Figure 1:
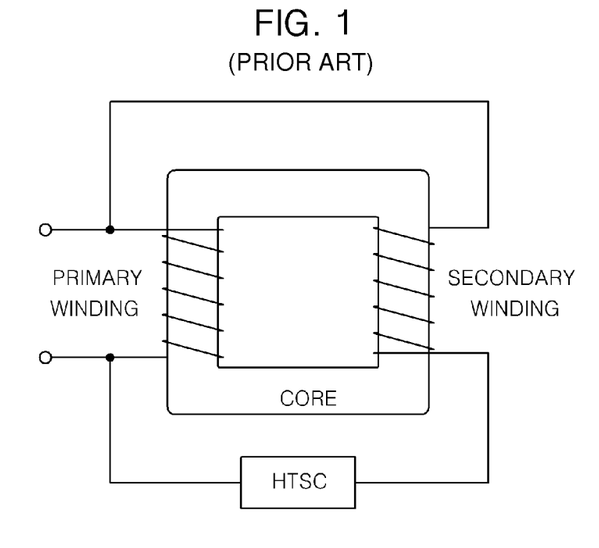
FIGS. 1 to 3 are diagrams showing examples of a conventional SFCL.
Figure 2:
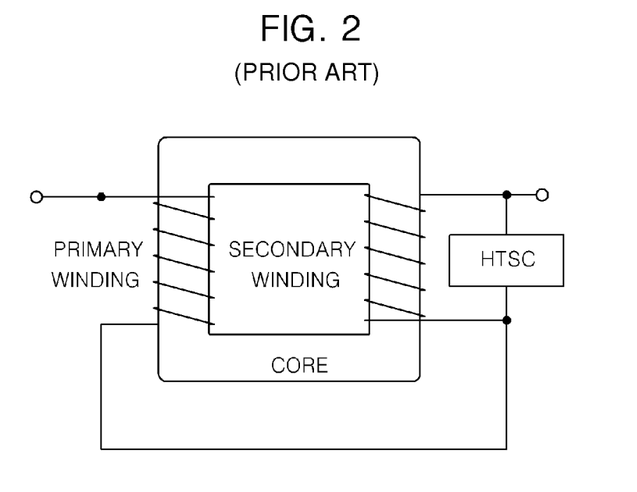
Figure 3:
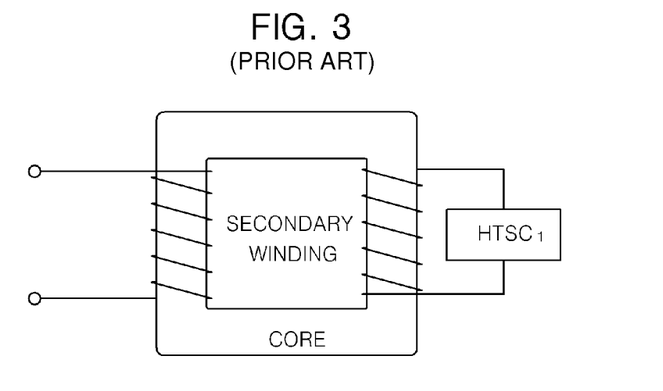

FIGS. 1 to 3 are diagrams showing examples of a conventional SFCL. The SFCL shown in FIGS. 1 to 3 uses magnetic coupling between two coils (a primary winding and a secondary winding) wound around the same core. The form of coupling between the primary winding and the secondary winding corresponds to parallel connection of a non-isolated type shown in FIG. 1, series connection of a non-isolated type shown in FIG. 2, and an isolated type shown in FIG. 3. Before a fault occurs, a High Temperature Superconductor (HTSC) maintains zero resistance in a superconducting state, and magnetic flux components generated by the two coils cancel each other, so that voltages induced in the respective coils become 0. However, when a fault occurs, and the current flowing through the HTSC exceeds a threshold, resistance is generated in the HTSC, and then magnetic flux components generated in the two coils do not cancel each other any more. Accordingly, voltages are induced in the respective coils, and impedance is generated in the SFCL, so that the fault current is limited.

Such an SFCL using magnetic coupling between two coils is characterized in that a burden on power caused by a fault can be divided into and exerted on the two coils, which are connected in a non-isolated type (in parallel or in series) or in an isolated type, and the HTSC, thus not only reducing the number of HTSCs, but also inducing a phenomenon (quench) in which series-connected HTSCs simultaneously make a phase transition to phase conductors because of magnetic coupling. Further, a current limiting magnitude can be effectively adjusted by controlling the intensity of the impedance through the adjustment of a turns ratio. However, since the problem of a drop in a bus voltage arises when a fault occurs, a method capable of solving such a voltage drop problem is required.

DISCLOSURE

Technical Problem

An object of the present invention is to provide an SFCL for suppressing a bus voltage drop in an electric power system, which can limit a fault current by generating resistance in a superconductor (HTSC) when a fault occurs, and which can prevent a bus voltage from dropping and can stably supply power by separating a faulty section.

Technical Solution

In order to accomplish the above object, a Superconducting Fault Current Limiter (SFCL) for suppressing a bus voltage drop in an electric power system according to the present invention includes a primary winding, a secondary winding, and a tertiary winding wound around an identical iron core; a superconductor connected to any one of the primary winding and the secondary winding; a first switch connected to any one of the primary winding and the secondary winding and configured to be opened so as to separate a faulty section when a fault current is generated and to be shorted when the fault current is eliminated; and a second switch connected in series to the tertiary winding and configured to be shorted so as to stably supply power when the fault current is generated and to be opened when the fault current is eliminated.

Advantageous Effects

In accordance with the SFCL for suppressing a bus voltage drop in an electric power system according to the present invention, there are advantages in that a fault current is limited using magnetic coupling between two coils that are connected in a non-isolated type (in parallel or in series) or in an isolated type and in that a faulty section is separated using a switch and power is stably supplied to a section, in which a bus voltage drop has occurred due to the fault current, using a tertiary winding and a switch connected thereto, thus improving the stability of the system and obtaining economic effects.

BEST MODE

Hereinafter, embodiments of a Superconducting Fault Current Limiter (SFCL) for suppressing a bus voltage drop in an electric power system according to the present invention will be described in detail with reference to the attached drawings.

Figure 4:
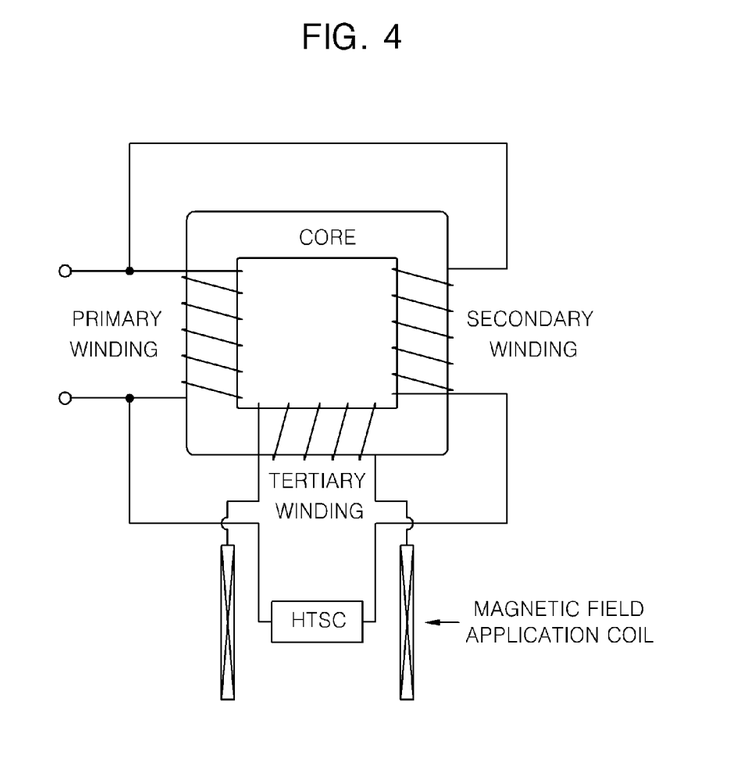
FIG. 4 is a diagram showing a form in which a magnetic field application coil is connected to a conventional SFCL having two coils wound around the same core.

FIG. 4 is a diagram showing a form in which a magnetic field application coil is connected to a conventional SFCL having two coils wound around the same core. In the SFCL of FIG. 4, a tertiary winding is further wound around the same core as are a primary winding and a secondary winding that are connected in parallel, and a magnetic field application coil (or a magnetic field coil) is installed on the tertiary winding. When a fault occurs, current flows through the tertiary winding due to the quench of a High Temperature Superconductor (HTSC), so that a magnetic field is generated which then influences the resistance of the HTSC.

Figure 5:
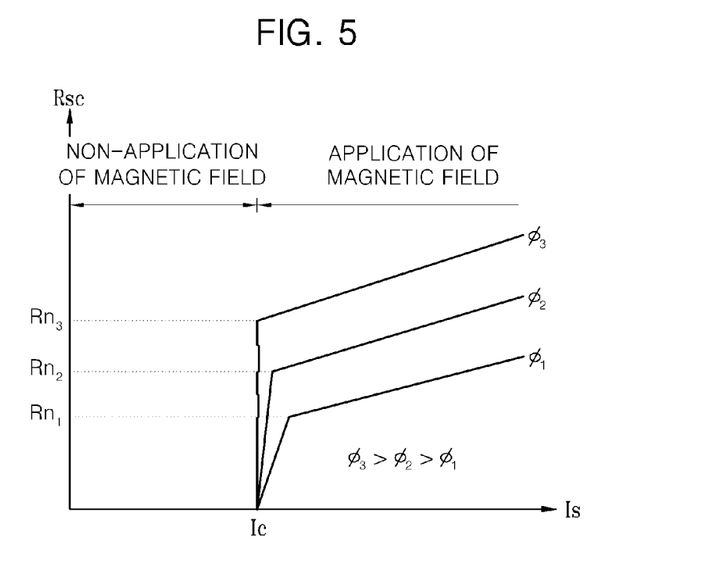
FIG. 5 is a graph showing the resistance of an HTSC depending on the intensity of a magnetic field generated by the magnetic field application coil.

FIG. 5 is a graph showing the resistance of an HTSC depending on the intensity of a magnetic field generated by a magnetic field application coil. Referring to FIG. 5, it can be seen that after current has flowed through a tertiary winding and a magnetic field has been generated, the resistance of the HTSC slowly increases.

Figure 6:
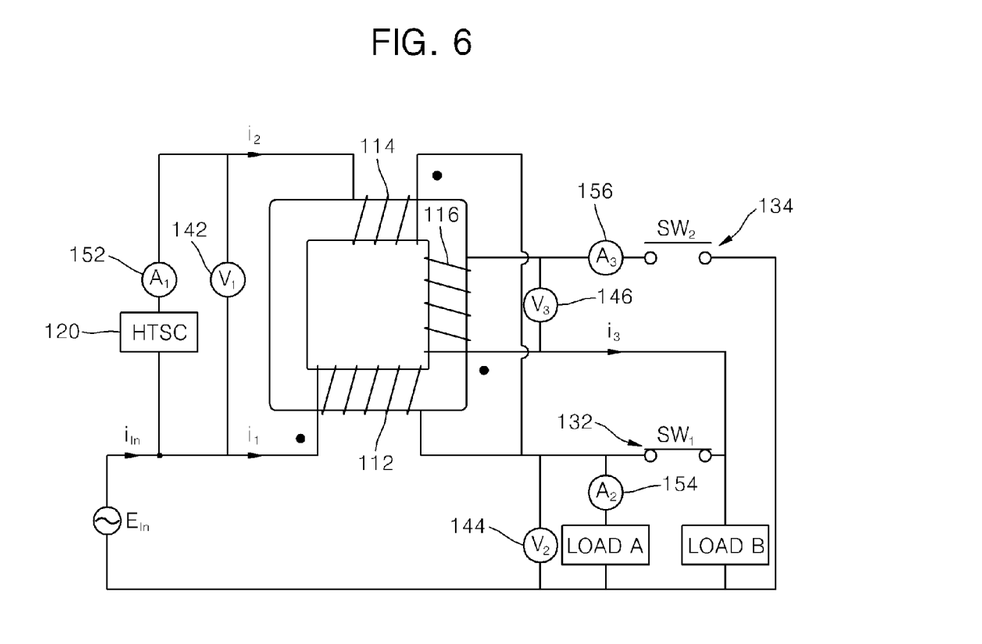
FIG. 6 is a diagram showing a first embodiment of an SFCL for suppressing a bus voltage drop in an electric power system according to the present invention.
Figure 7:
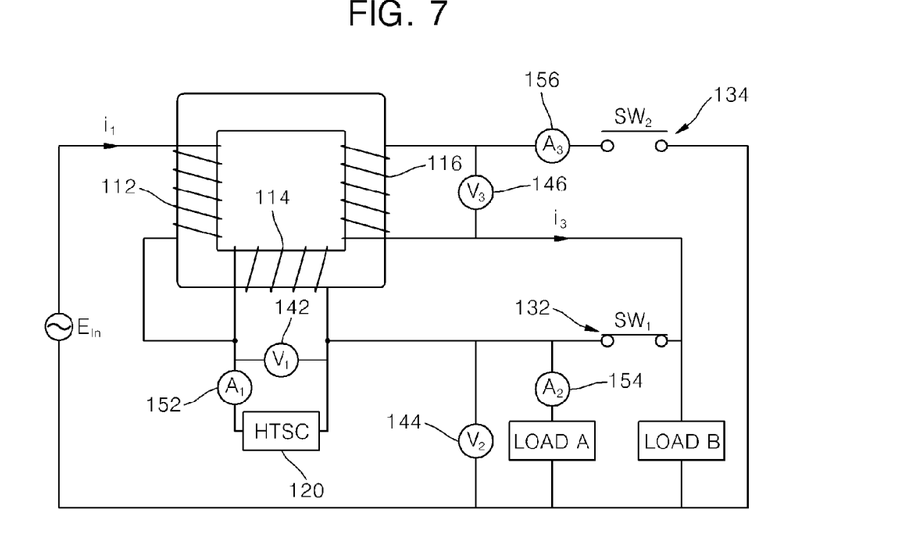
FIG. 7 is a diagram showing a second embodiment of an SFCL for suppressing a bus voltage drop in an electric power system according to the present invention.
Figure 8:
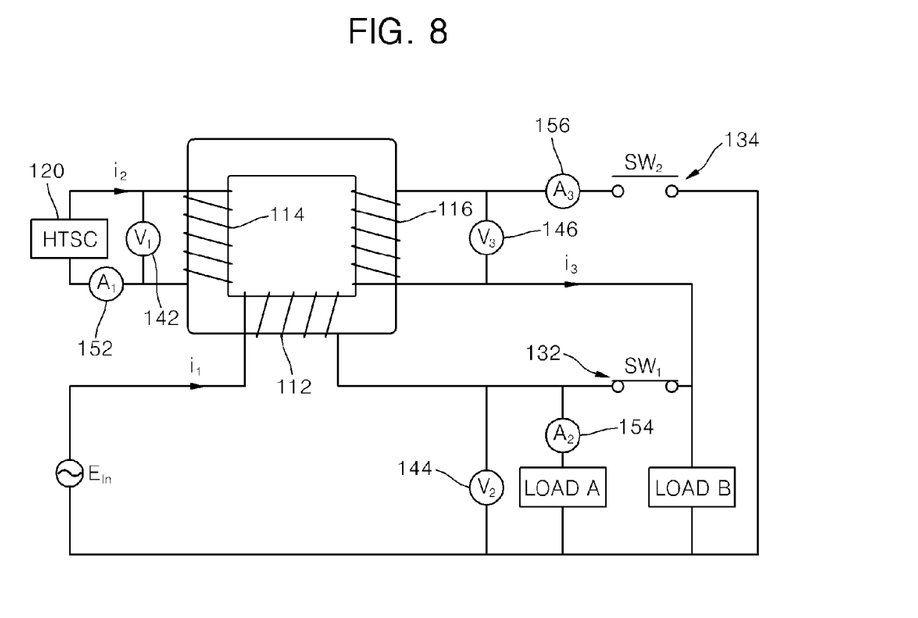
FIG. 8 is a diagram showing a third embodiment of an SFCL for suppressing a bus voltage drop in an electric power system according to the present invention.

FIGS. 6 to 8 are diagrams respectively showing first to third embodiments of the SFCL for suppressing a bus voltage drop in an electric power system according to the present invention. Referring to FIGS. 6 to 8, the SFCL according to the present invention includes three coils 112, 114, and 116 wound around the same iron core, a HTSC 120, two switches 132 and 134, three voltage sensors 142, 144, and 146 and three current sensors 152, 154, and 156.

Among the three coils 112, 114, and 116 connected to the core, the primary winding 112 and the secondary winding 114 can be connected in series or in parallel in a non-isolated type, or connected in an isolated type. In the first embodiment of the SFCL according to the present invention shown in FIG. 6, the primary winding 112 and the secondary winding 114 can be connected in parallel in a non-isolated type. In the second embodiment shown in FIG. 7, the windings can be connected in series in a non-isolated type In the third embodiment shown in FIG. 8, the windings can be connected in an isolated type. Further, as shown in FIGS. 6 to 8, the HTSC 120 is connected to the primary winding 112 or the secondary winding 114 in a non-isolated type or an isolated type, and functions to limit a fault current. Up to this point, the HTSC 120 has a configuration identical to that of the conventional SFCL described with reference to FIGS. 1 to 3.

Meanwhile, the tertiary winding 116 is wound around the same core as are the primary winding 112 and the secondary winding 114. The tertiary winding 116 is connected to the second switch 134 which will be described later, and is configured to stably supply power to a section in which a drop in a bus voltage occurs when a fault current is generated. In this case, the opening or shorting of the second switch 134 can be performed by the third voltage sensor 146 or the third current sensor 156 connected to the tertiary winding 116.

The operation of the first switch 132 provided to separate a faulty section when a fault current is generated can be controlled by one of the following several methods. First, when the voltage or current of the HTSC 120, which increases to a predetermined value or more, is measured by the first voltage sensor 142 and the first current sensor 152 that measures the voltage or the current of the HTSC 120, a faulty section can be separated by opening the first switch 132. Further, when the voltage or the current of a load, which decreases to a predetermined value or less, is measured by the second voltage sensor 144 and the second current sensor 154 that measures the voltage or the current of the load, the first switch 132 can be opened. As another method, a method of operating the first switch 132 as a circuit breaker via communication when a fault current is generated can be implemented. An Under Voltage Relay (UVR) can be used as the first switch 132. In the case when the first switch 132 is the UVR, if a voltage drop is sensed and then the UVR is operated, this operation is recognized as a control signal, so that the second switch 134 is operated.

Through the above-described method, after the faulty section has been separated by opening the first switch 132, the second switch 134 must be shorted in order to supply power to a section in which the bus voltage has dropped due to the fault. As described above, the shorting of the second switch 134 is performed by the third voltage sensor 146 or the third current sensor 156. For example, when the voltage of the tertiary winding 116 measured by the third voltage sensor 146 increases to a preset reference voltage or more, the third voltage sensor 146 enables power to be supplied to the bus, the voltage of which has dropped, by shorting the second switch 134.

Methods of operating the first switch 132 and the second switch 134 are not limited to the above-described methods. The second switch 134 can be operated using the same method as that of the first switch 132, and the first switch 132 can be operated using the same method as that of the second switch 134. In this case, the voltage sensors 142, 144, and 146 and the current sensors 152, 154, and 156 can individually set reference voltages or reference currents required to operate the individual switches 132 and 134.

Further, as the fault has been eliminated and the voltage of the tertiary winding 116 has decreased, when the voltage measured by the third voltage sensor 146 becomes less than the reference voltage, the third voltage sensor 146 reopens the second switch 134. Since the first switch 132 is shorted using any one of the above-described methods due to the elimination of the fault, the SFCL according to the present invention recovers to the state before the fault occurred.

Figure 9:
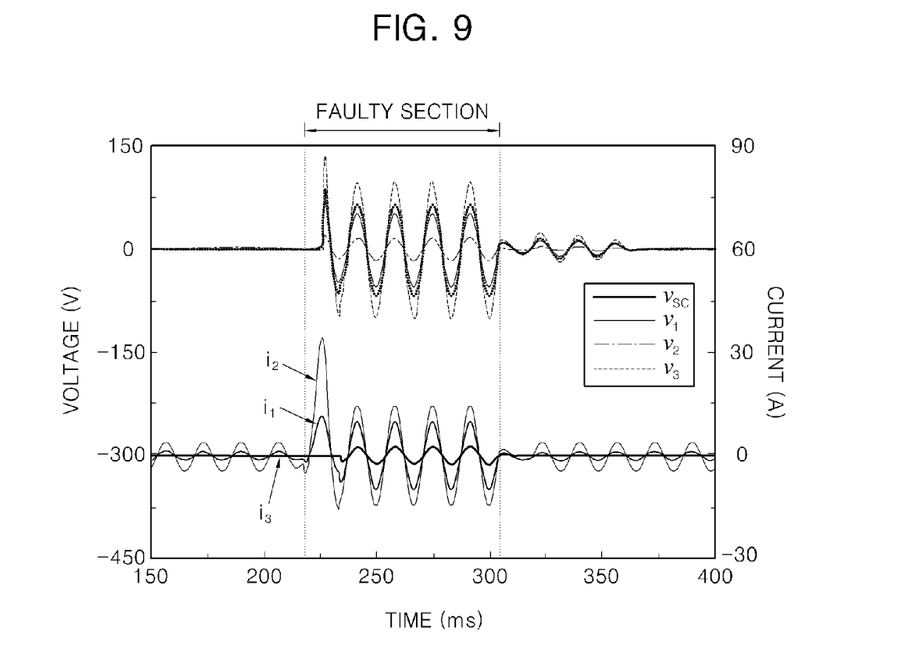
FIG. 9 is a graph showing voltage and current variations in individual portions occurring over time.

The SFCL according to the present invention was applied to a simulation system and then a simulation was performed. FIG. 9 is a graph showing voltage and current variations in individual portions occurring over time, wherein currents $i_1$ to $i_3$ are indicated in FIGS. 4a and 4b. Referring to FIG. 9, it can be seen that a voltage and a current are generated in each coil as a fault occurs.

Figure 10:
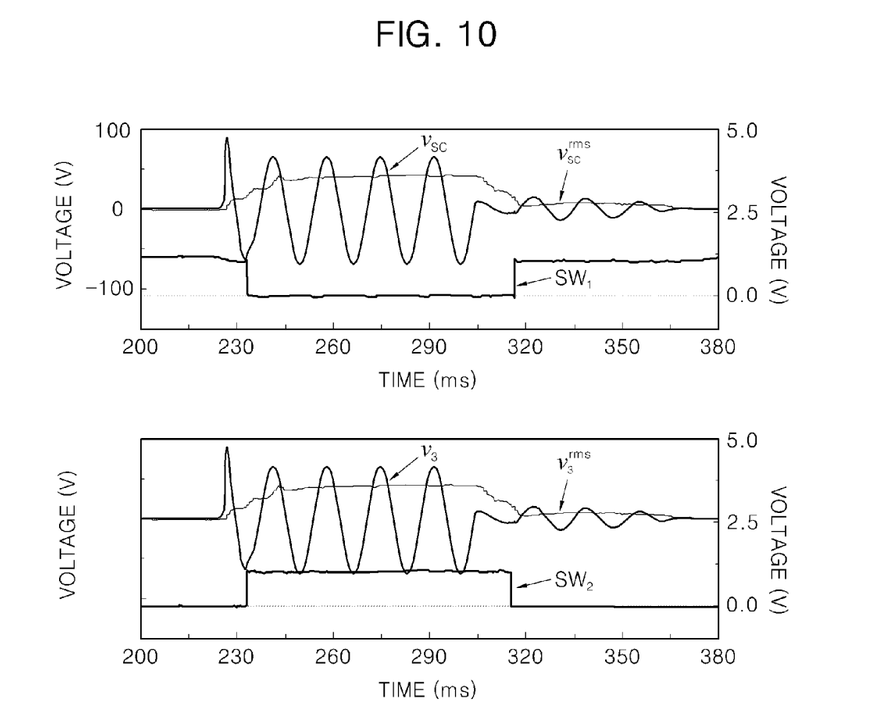
FIG. 10 is a graph showing the operations of respective switches when a fault occurs.

FIG. 10 is a graph showing a graph in which the operations of respective switches 132 and 134 are indicated when a fault occurs, wherein $SW_1$ denotes the operation of the first switch 132 and $SW_2$ denotes the operation of the second switch 134. Referring to FIG. 10, it can be seen that when a fault current is generated, the first switch 132 is opened, and the second switch 134 is shorted, and that when the fault is eliminated, the first switch 132 is immediately shorted, and the second switch 134 is opened.

Figure 11:
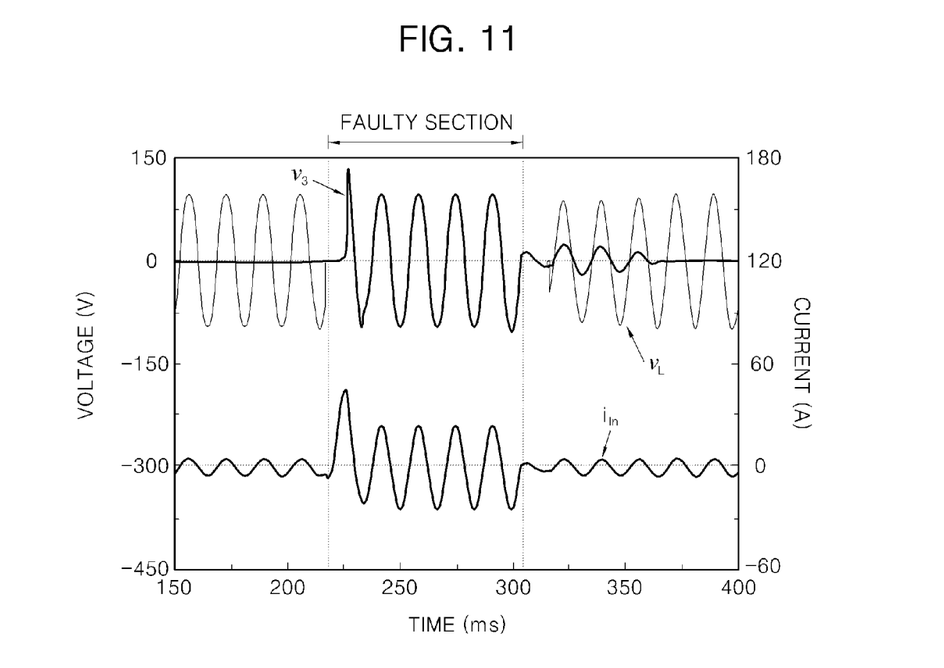
FIG. 11 is a graph showing the current limiting characteristics and uninterruptible power supply characteristics of the SFCL according to the present invention.

Further, FIG. 11 is a graph showing the waveforms of current limiting characteristics and power supply characteristics of the SFCL according to the present invention. It can be seen in FIG. 11 that the HTSC 120 promptly senses a fault current and limits the current, and then stably supplies power to a section in which a bus voltage has dropped during a faulty section.

Figure 12:
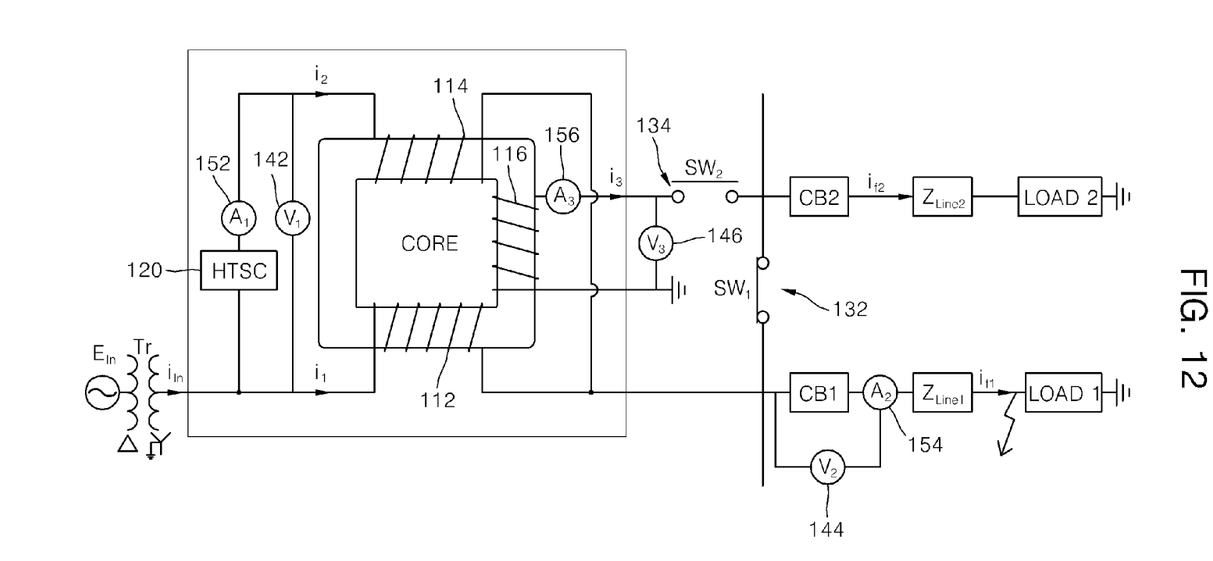
FIG. 12 is a diagram showing a first embodiment of the case when the SFCL according to the present invention is applied to a power distribution system in which a short circuit occurred.
Figure 13:
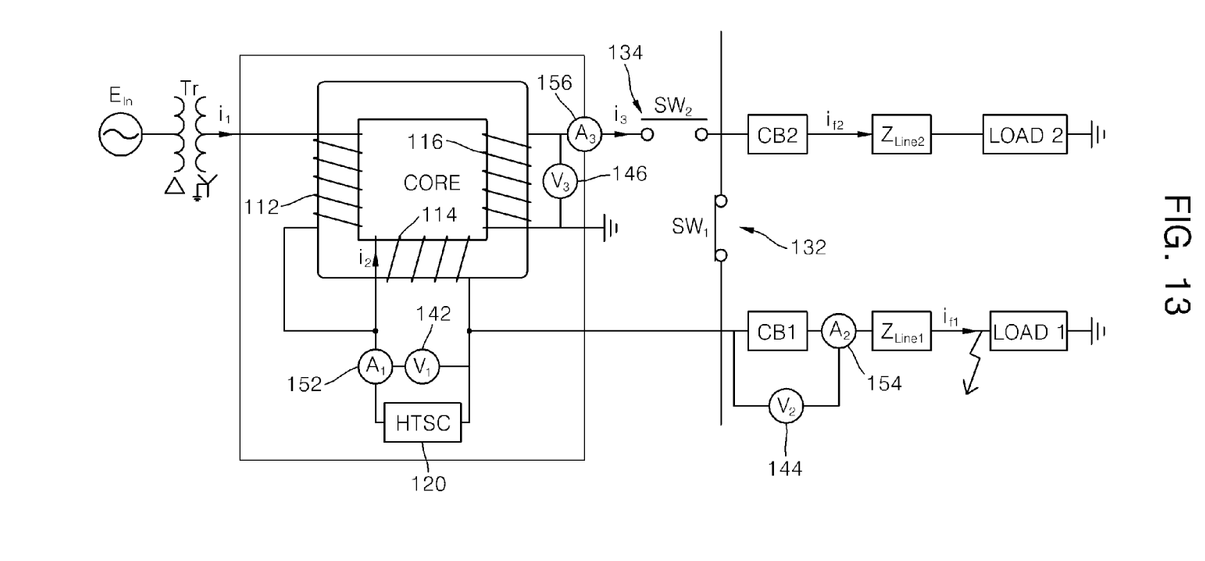
FIG. 13 is a diagram showing a second embodiment of the case when the SFCL according to the present invention is applied to a power distribution system in which a short circuit occurred.
Figure 14:
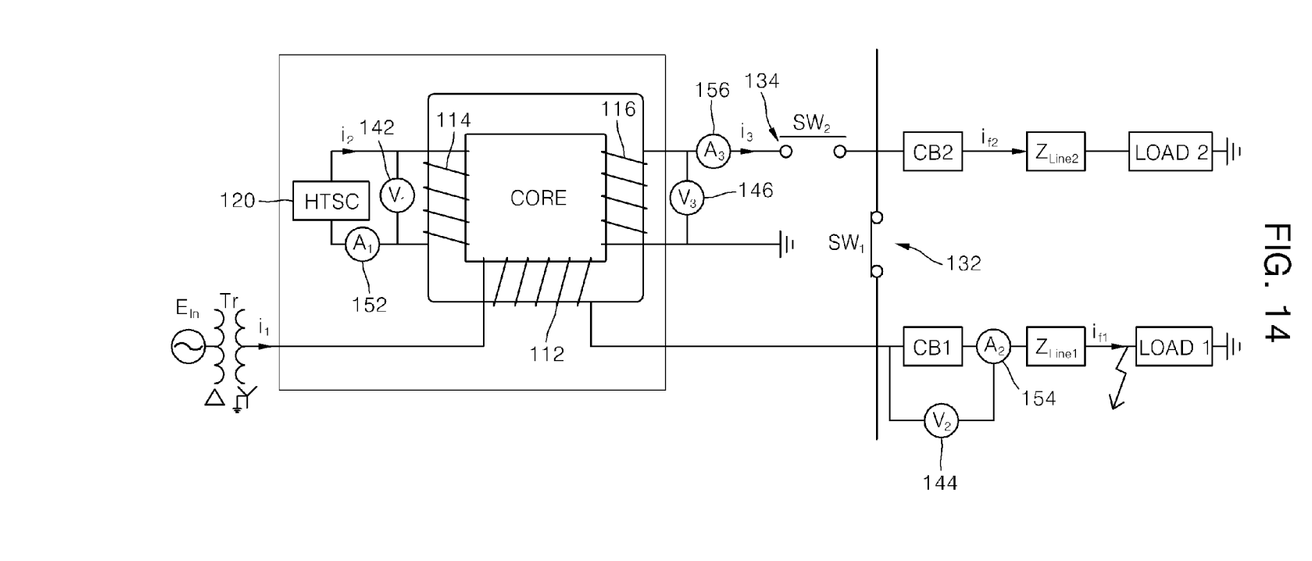
FIG. 14 is a diagram showing a third embodiment of the case when the SFCL according to the present invention is applied to a power distribution system in which a short circuit occurred.

FIGS. 12 to 14 are diagrams showing embodiments of the case where the SFCL according to the present invention is applied to a power distribution system in which a short circuit occurred. FIG. 12 illustrates the case when the first embodiment of the present invention shown in FIG. 6 is applied, FIG. 13 illustrates the case when the second embodiment of the present invention shown in FIG. 7 is applied, and FIG. 14 illustrates the case when the third embodiment of the present invention shown in FIG. 8 is applied.

Figure 15:
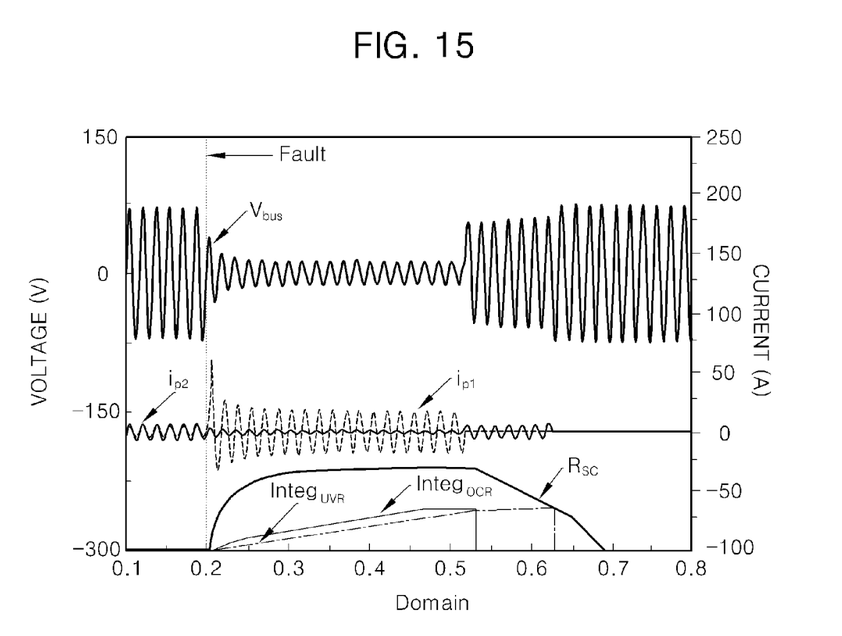
FIG. 15 is a graph showing voltage and current variations occurring when the conventional SFCL is applied.
Figure 16:
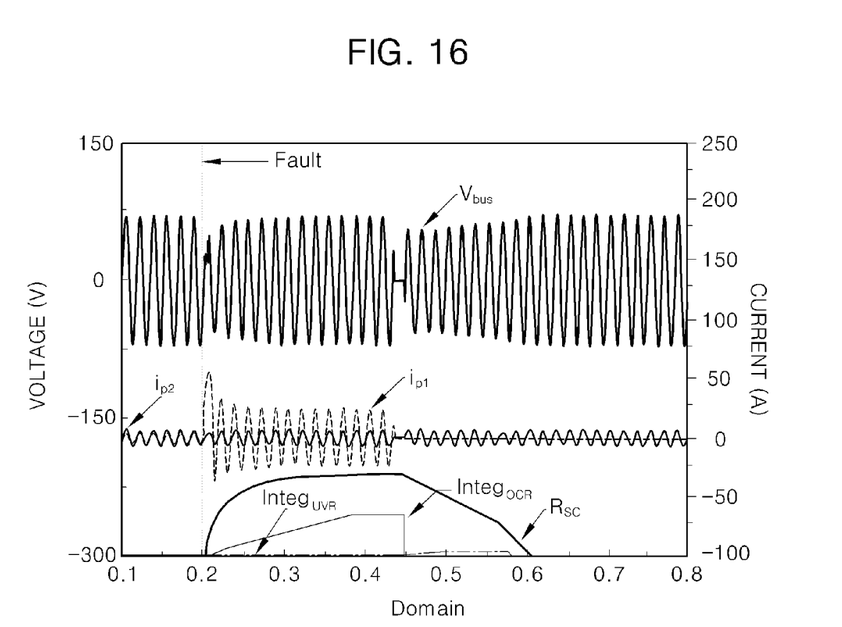
FIG. 16 is a graph showing voltage and current variations occurring when the SFCL according to the present invention is applied.

FIGS. 15 and 16 are graphs showing voltage and current variations when the conventional SFCL and the SFCL of the present invention are respectively applied.

First, referring to FIG. 15, in the case where the conventional SFCL is applied to the power distribution system, a fault current $i_{p1}$ is limited when a fault occurs, but a drop in a bus voltage $V_{bus}$ occurs. Therefore, it can be seen that the UVR is operated not only in a fault feeder but also in a sound feeder, so that a power failure section has occurred. Compared to this, referring to FIG. 16, the SFCL according to the present invention not only can limit a fault current $i_{p1}$ when a fault occurs, but also can compensate for a drop in the bus voltage $V_{bus}$ attributable to a short circuit by stably supplying power, unlike the conventional SFCL.

Although the preferred embodiments of the present invention have been illustrated and described, it is apparent that the present invention is not limited to the above-described specific embodiments, and those skilled in the art can modify the present invention in various manners without departing from the scope and spirit of the invention as disclosed in the accompanying claims. Such modifications should be interpreted as being included in the scope of the claims.

The invention claimed is:

1. A Superconducting Fault Current Limiter (SFCL) comprising:
   a primary winding, a secondary winding, and a tertiary winding wound around an identical iron core;
   a superconductor connected to any one of the primary winding and the secondary winding;
   a first switch connected to any one of the primary winding and the secondary winding and configured to be opened so as to separate a faulty section when a fault current is generated and to be shorted when the fault current is eliminated; and
   a second switch connected in series to the tertiary winding and configured to be shorted so as to stably supply power when the fault current is generated and to be opened when the fault current is eliminated.

2. The SFCL of claim 1, wherein when a voltage or a current measured at the superconductor increases due to the generation of the fault current, the first switch is opened and the second switch is shorted.

3. The SFCL of claim 1, wherein when a voltage or a current measured at a load decreases due to the generation of the fault current, the first switch is opened and the second switch is shorted.

4. The SFCL of claim 1, wherein when a voltage or a current measured at the tertiary winding increases due to the generation of the fault current, the first switch is opened and the second switch is shorted.

5. The SFCL of claim 1, wherein the first switch and the second switch are opened or shorted via communication in response to a signal transmitted from a circuit breaker when the generation or elimination of the fault current is detected by the circuit breaker.

6. The SFCL of claim 1, wherein the first switch is an Under Voltage Relay (UVR) and the second switch is operated in response to a control signal based on an operation of the first switch.

* * * * *